United States Patent [19]

Nagel et al.

[11] Patent Number: 5,537,940
[45] Date of Patent: Jul. 23, 1996

[54] METHOD FOR TREATING ORGANIC WASTE

[75] Inventors: Christopher J. Nagel, Wayland; Kevin A. Sparks, Scituate, both of Mass.; Casey E. McGeever, Allison Park, Pa.

[73] Assignee: Molten Metal Technology, Inc., Waltham, Mass.

[21] Appl. No.: 351,382

[22] PCT Filed: Jun. 8, 1993

[86] PCT No.: PCT/US93/05398

§ 371 Date: Jan. 6, 1995

§ 102(e) Date: Jan. 6, 1995

[87] PCT Pub. No.: WO93/25277

PCT Pub. Date: Dec. 23, 1993

[51] Int. Cl.⁶ ..................................................... F23G 7/00
[52] U.S. Cl. ........................ 110/346; 110/238; 423/418.2; 588/201
[58] Field of Search ...................... 110/238, 266, 110/243, 244, 346; 423/650, 651, 437 R, 415 A, DIG. 12, 418.2; 588/201, 205, 900, 901

[56] References Cited

U.S. PATENT DOCUMENTS

| | | | |
|---|---|---|---|
| 1,803,221 | 4/1931 | Tyrer | 423/650 |
| 1,968,063 | 7/1934 | Woodhouse | 23/212 |
| 2,449,359 | 9/1948 | Abrams et al. | 48/196 |
| 2,647,045 | 7/1953 | Rummel | 48/206 |
| 3,252,774 | 5/1966 | McMahon et al. | 48/214 |
| 3,619,144 | 11/1971 | Bawa et al. | 23/282 |
| 3,850,742 | 11/1974 | Dugan et al. | 208/114 |
| 3,852,188 | 12/1974 | Dugan et al. | 208/114 |
| 3,969,490 | 7/1976 | de Bueckelaer et al. | 423/481 |
| 4,345,990 | 8/1982 | Fahlström et al. | 208/11 |
| 4,388,084 | 6/1983 | Okane et al. | 48/197 |
| 4,389,246 | 6/1983 | Okamura et al. | 75/60 |
| 4,496,369 | 1/1985 | Törneman | 48/92 |
| 4,511,372 | 4/1985 | Axelsson | 48/197 |
| 4,574,714 | 3/1986 | Bach et al. | 110/346 |
| 4,602,574 | 7/1986 | Bach et al. | 110/346 |
| 4,681,599 | 7/1987 | Obkircher | 48/92 |
| 4,684,402 | 8/1987 | Geskin et al. | 75/51.5 |
| 5,069,716 | 12/1991 | Dam et al. | 423/651 |
| 5,078,788 | 1/1992 | Bueno et al. | 423/651 |
| 5,152,831 | 10/1992 | Yamaguchi et al. | 75/512 |
| 5,177,304 | 1/1993 | Nagal | 423/437 |
| 5,191,154 | 3/1993 | Nagal | 423/DIG. 12 |
| 5,298,233 | 3/1994 | Nagel | 423/DIG. 12 |
| 5,301,620 | 4/1994 | Nagel et al. | 423/DIG. 12 |
| 5,436,210 | 7/1995 | Wilkinson et al. | 588/900 |

FOREIGN PATENT DOCUMENTS

| | | |
|---|---|---|
| 0085153 | 8/1983 | European Pat. Off. . |
| 0175207 | 3/1986 | European Pat. Off. . |
| 2843997 | 4/1980 | Germany . |
| 3207203.1 | 10/1983 | Germany . |
| 666119 | 2/1952 | United Kingdom . |
| 1437750 | 6/1976 | United Kingdom . |
| 2189504 | 10/1987 | United Kingdom . |
| WO94/04633 | 3/1994 | WIPO . |

*Primary Examiner*—John T. Kwon
*Attorney, Agent, or Firm*—Hamilton, Brook, Smith & Reynolds

[57] ABSTRACT

Organic waste is treated in a molten metal bath to sequentially form enriched hydrogen gas and carbon oxide gas streams. The method includes introducing organic waste to a molten metal bath in the absence of a separate oxidizing agent and under conditions that will decompose the organic waste. As a consequence of this decomposition, an enriched hydrogen gas stream is generated and the molten metal bath becomes carbonized. Thereafter, an oxidizing agent is added to the carbonized molten metal bath to oxidize the carbon contained in the carbonized molten metal bath. Reaction of the oxidizing agent with the carbon causes formation of a carbon oxide that escapes from the bath as an enriched carbon oxide gas stream, thereby decarbonizing the molten metal bath.

13 Claims, 2 Drawing Sheets

5,537,940

METHOD FOR TREATING ORGANIC WASTE

RELATED APPLICATIONS

This application is the U.S. National Phase of International Application No. PCT/US93/05398, filed on Jun. 8, 1993, which is a Continuation-in-Part Application of U.S. patent application Ser. No. 07/895,358, filed Jun. 8, 1992. The teachings of the applications are hereby incorporated by reference.

BACKGROUND OF THE INVENTION

Disposal of organic wastes in landfills and by incineration has become an increasingly difficult problem because of diminishing availability of disposal space, strengthened governmental regulations, and the growing public awareness of the impact of hazardous substance contamination upon the environment. Release of hazardous organic wastes to the environment can contaminate air and water supplies thereby diminishing the quality of life in the affected populations.

To minimize the environmental effects of the disposal of organic wastes, methods must be developed to convert these wastes into benign, and preferably, useful substances. In response to this need, there has been a substantial investment in the development of alternate methods for suitably treating hazardous organic wastes. One of the most promising new methods is described in U.S. Pat. Nos. 4,574,714 and 4,602,574, issued to Bach and Nagel. The Bach/Nagel method for destroying organic material, including toxic wastes, involves decomposition of the organic material to its atomic constituents in a molten metal and reformation of these atomic constituents into environmentally acceptable products, including hydrogen, carbon monoxide and/or carbon dioxide gases.

SUMMARY OF THE INVENTION

The present invention relates to a method for treating organic waste in molten metal contained in a vessel to sequentially form enriched hydrogen gas and carbon oxide gas streams.

In one embodiment, an organic waste containing hydrogen and carbon is introduced into molten metal, without the addition of a separate oxidizing agent and under conditions sufficient to decompose the organic waste and to generate an enriched hydrogen gas stream and to carbonize the molten metal. The enriched hydrogen gas stream is substantially removed from the vessel. Thereafter, a separate oxidizing agent is added into the carbonized molten metal to oxidize carbon contained in the carbonized molten metal to form an enriched carbon oxide gas stream. The enriched carbon oxide gas stream is substantially removed from the vessel.

In another embodiment of the invention employed to increase the amount of carbon dioxide to carbon monoxide in the enriched carbon oxide gas stream, the organic waste is introduced into molten metal contained in a vessel which comprises two immiscible metals wherein the first immiscible metal has a free energy of oxidation, at the operating conditions, greater than that for oxidation of carbon to carbon monoxide and the second immiscible metal has a free energy of oxidation, at the operating conditions, greater than that for oxidation of carbon monoxide to carbon dioxide, without the addition of a separate oxidizing agent and under conditions sufficient to decompose the organic waste and to generate an enriched hydrogen gas stream and to carbonize at least one of the two immiscible metals. The enriched hydrogen gas stream is substantially removed from the vessel. Thereafter, a separate oxidizing agent is added into the carbonized molten metal to oxidize carbon contained in the carbonized molten metal to generate an enriched carbon monoxide and carbon dioxide gas stream having a significantly increased ratio of carbon dioxide/carbon monoxide compared to that produced in molten iron under the same conditions and decarbonizing the molten metal. The enriched carbon oxide gas stream is substantially removed from the vessel.

This invention has the advantage of treating organic waste to form an enriched stream of hydrogen gas and a separate enriched stream of carbon oxide gas, such as carbon monoxide or carbon dioxide or both. Enriched hydrogen and/or carbon oxide gas streams are often desired. For example, an enriched stream of hydrogen gas is particularly useful in the synthesis of ammonia or oxoalcohol and in hydrogenation or desulfurization processes. Hydrogen is also an excellent "clean" or "greenhouse gas free" fuel.

DETAILED DESCRIPTION OF THE INVENTION

The features and other details of the method of the invention will now be more particularly described with reference to the accompanying drawings and pointed out in the claims. It will be understood that the particular embodiments of the invention are shown by way of illustration and not as limitations of the invention. The principle features of this invention can be employed in various embodiments without departing from the scope of the invention.

The present invention generally relates to a method for treating organic waste in molten metal to separately form enriched hydrogen and carbon oxide gas streams. This invention is an improvement of the Bach/Nagel method disclosed in U.S. Pat. Nos. 4,574,714 and 4,602,574, the teachings of which are incorporated by reference.

Figure 1:
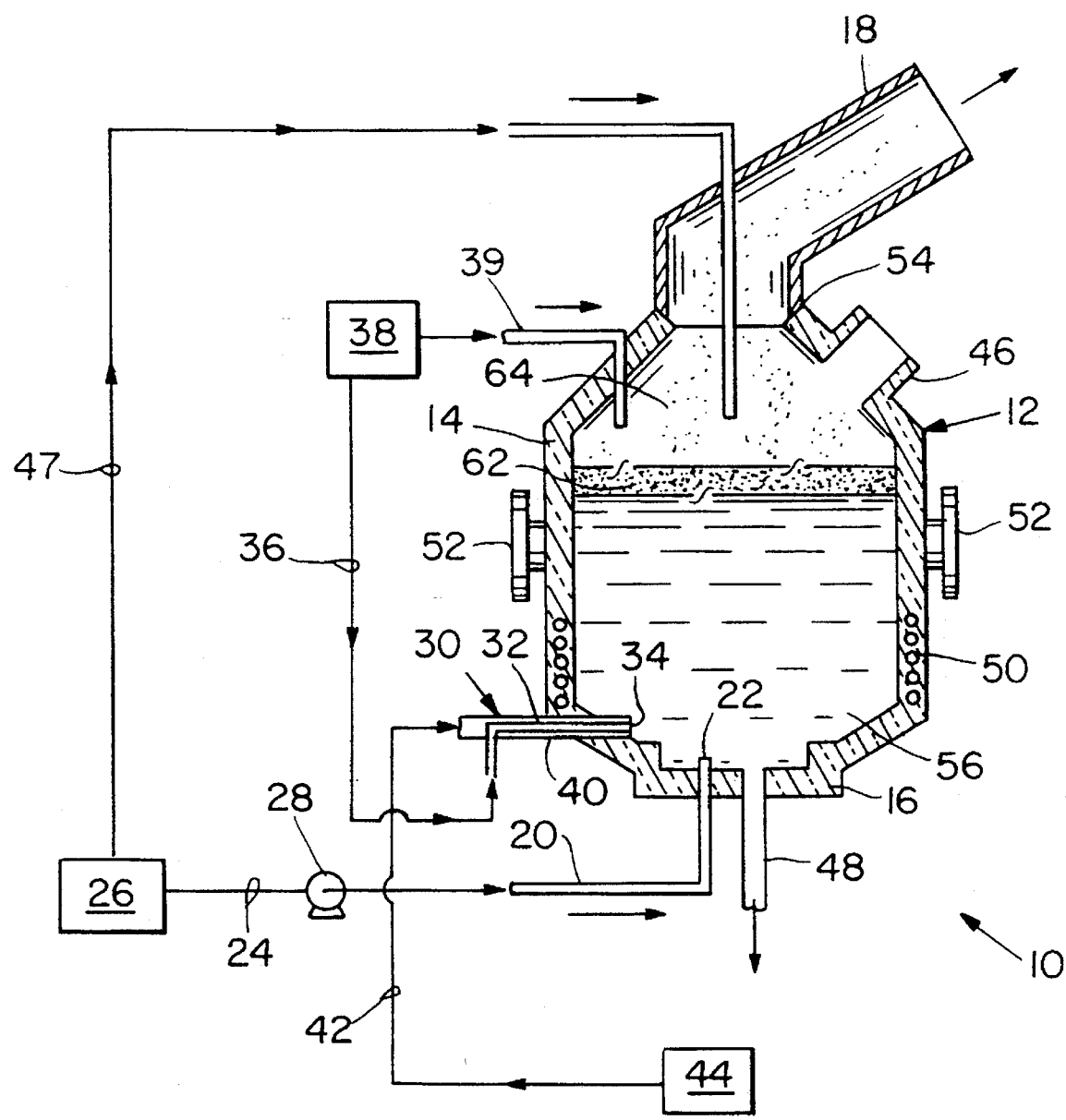
FIG. 1 is a schematic representation of a system for sequentially forming enriched hydrogen and enriched carbon oxide gas streams from an organic waste in molten metal by a method according to this invention.

One embodiment of the invention is illustrated in FIG. 1. Therein, system 10 includes reactor 12. Examples of suitable reactors include appropriately modified steelmaking vessels known in the art as K-BOP, Q-BOP, argon-oxygen decarbonization furnaces (AOD), BOF, etc. Reactor 12 includes upper portion 14 and lower portion 16. Off-gas outlet 18 extends from upper portion 14 and is suitable for conducting an off-gas composition out of reactor 12.

Organic waste inlet tube 20 includes organic material inlet 22 and extends from lower portion 16 of reactor 12. Line 24 extends between organic waste source 26 and organic waste inlet tube 20. Pump 28 is disposed in line 24 for directing organic waste from organic waste source 26 through organic waste inlet tube 20 and into molten metal contained in reactor 12.

Tuyere 30 is disposed at lower portion 16 of reactor 12. Tuyere 30 includes oxidizing agent tube 32 for injection of a separate oxidizing agent at oxidizing agent inlet 34. Line 36 extends between oxidizing agent tube 32 and oxidizing agent source 38. Outer tube 40 of tuyere 30 is disposed concentrically about oxidizing agent tube 32 at oxidizing agent inlet 34. Line 42 extends between outer tube 40 and shroud gas source 44 for conducting a suitable shroud gas from shroud gas source 44 through the concentric opening between outer tube 40 and oxidizing agent tube 32 to oxidizing agent inlet 34.

It is to be understood, however, that more than one organic waste tube or more than one oxidizing agent tube, or combinations thereof, can be disposed at the lower portion of reactor 12 for introduction of organic waste and an oxidizing agent into reactor 12. Suitable organic waste can also, optionally, be introduced into reactor 12 through port 46 and/or conducted from organic waste source 26 through line 47 to reactor 12. Other means, such as an injection lance (not shown), can also be employed to introduce organic waste into molten metal in carbonization reactor 12.

Bottom tapping spout 48 extends from lower portion 16 of reactor 12 and is suitable for removal of molten metal from reactor 12.

Induction coil 50 is disposed at lower portion 16 for heating molten metal 56 in reactor 12. It is to be understood that, alternatively, reactor 12 can be heated by other suitable means, such as by oxyfuel burners, electric arcs, etc.

Trunions 52 are disposed at reactor 12 for manipulation of reactor 12. Seal 54 is disposed between off-gas outlet 18 and port 46 and is suitable for allowing partial rotation of reactor 12 about trunions 52 without breaking seal 54.

Molten metal 56 is disposed within reactor 12. In one embodiment, molten metal 56 comprises a metal having a free energy of oxidation, at operating conditions of system 10, which is greater than the free energy for conversion of atomic carbon to carbon monoxide. Examples of suitable metals include iron, chromium and manganese. Molten metal 56 can include more than one metal. For example, molten metal 56 can include a solution of miscible metals, such as iron and chromium.

Suitable metals are those with melting points within the operating conditions of the system. It is preferred, for example, to run system 10 in a temperature range of from about 1300° C. to about 1700° C.

Suitable metals must also have a carbon solubility sufficient to allow significant amounts of hydrogen to be generated as organic waste is decomposed and the molten metal becomes carbonized. Thus, metals with a carbon solubility of greater than about 0.5 percent, by weight, are preferred, and those with a carbon solubility of greater than about two percent, by weight, are particularly preferred. In the cases where more than one metal is employed, at least one of the metals should have the aforementioned carbon solubility.

In many cases, it is also preferred to have the viscosity of the molten metal in reactor 12 less than about ten centipoise at the operating conditions of reactor 12.

Molten metal 56 is formed by at least partially filling reactor 12 with a suitable metal. The metal is then heated to a suitable temperature by activation of induction coil 52 or by other suitable means, not shown. Suitable operating conditions of system 10 include a temperature sufficient to at least partially convert organic waste by decomposition to hydrogen and carbon. Generally, a temperature in the range of between about 1,300° and about 1,700° C. is suitable.

Optionally, molten metal 56 can have vitreous or slag layer 62. Vitreous layer 62, which is disposed on molten metal 56, is substantially immiscible with molten metal 56. Vitreous layer 62 can have a lower thermal conductivity than that of molten metal 56. Radiant heat loss from molten metal 56 can thereby be reduced to significantly below the radiant heat loss from molten bath where no vitreous layer is present.

Typically, a vitreous layer 62 includes at least one metal oxide having a free energy of oxidation, at the operating conditions of system 10, which is less than that for the oxidation of atomic carbon to carbon monoxide, such as calcium oxide (CaO). Vitreous layer 62 can contain a suitable compound for scrubbing halogens, such as chlorine or fluorine, to prevent formation of hydrogen halide gases, such as hydrogen chloride.

A wide variety of organic waste is suitable for treatment by this invention. An example of a suitable organic waste is a hydrogen-containing carbonaceous material, such as oil or a waste which includes organic compounds containing nitrogen, sulfur, oxygen, etc. It is to be understood that the organic waste can include inorganic compounds. In addition to carbon and hydrogen, the organic waste can include other atomic constituents, such as halogens, metals, etc. Organic waste does not need to be anhydrous. However, significant amounts of water in the organic waste can cause the water to act as an oxidizing agent, thereby interfering with the formation of an enriched hydrogen gas. For the production of a greater yield of enriched hydrogen gas, a preferred organic waste includes a relatively high hydrogen containing carbonaceous material, such as propane, butane, etc. For the production of a greater yield of enriched carbon oxide gas, a preferred organic waste includes a low hydrogen containing carbonaceous material, such as tars, oils, olefins, etc.

Organic waste is directed from organic waste source 26 through line 24 by pump 28 and is injected into molten metal 56 through organic waste tube 20. In one embodiment, the organic waste is a fluid which can include organic waste components dissolved or suspended within a liquid. In another, solid particles of organic waste components are suspended in an inert gas, such as argon.

Organic waste directed into molten metal 56 is converted to carbon, hydrogen and its other atomic constituents. The atomic hydrogen is then formed into hydrogen gas in the absence of an oxidizing agent and the molten metal is concurrently carbonized. The term, "carbonize," as used herein, means the addition of atomic carbon to molten metal to increase the overall quantity of carbon contained in the molten metal without any substantial losses of carbon from the molten metal due to oxidation by a separately added oxidizing agent. It is understood, of course, that the organic waste may contain one or more oxidizing agents but these are not considered separately added oxidizing agents.

Hydrogen gas migrates through molten metal 56, by diffusion, bubbling or other means. At least a portion of the hydrogen migrates to a portion of molten metal 56 proximate to off-gas outlet 18 to form an enriched hydrogen gas stream. An enriched hydrogen gas stream, as that term is used herein, means a gas stream wherein the molar fraction of hydrogen contained in the gas stream, based upon the total hydrogen and carbon oxide in the gas stream, is greater than that generally produced in a typical process disclosed by Bach/Nagel in U.S. Pat. Nos. 4,574,714 and 4,602,574 for the simultaneous, combined decomposition and oxidation of an organic waste. The molar fraction of hydrogen is the ratio of the moles of hydrogen contained in a gas stream to the sum of the moles of hydrogen and moles of carbon oxide gases contained in the gas stream.

The concentration of dissolved carbon in carbonized molten metal 36 is preferably limited to an amount below the saturation point for carbon at the temperature of molten metal 36. Thus, for iron, the concentration of atomic carbon preferably is limited to a concentration of less than about five percent, by weight, at 1,800° C. Where molten metal 36 is cobalt, the saturation point of carbon is in the range of between about three percent at 1,400° C. and about 4.3 percent, by weight, at 1,800° C. Similarly for manganese, the saturation point of carbon is in the range of between about eight percent at 1,400° C. and about 8.5 percent, by weight, at 1,800° C. For chromium the saturation point of carbon is in the range of between about eleven percent at 1,800° C. and about fifteen percent, by weight, at 2,000° C.

If carbon contained in the molten metal becomes insoluble because the molten metal is saturated with carbon, the insoluble portion of the carbon may become entrained in the enriched hydrogen gas stream and thereby be removed from the molten metal through off-gas outlet 18. If this happens, suitable apparatus known in the art can be used to separate the entrained carbon dust from the hydrogen gas stream. Examples of suitable apparatus include a cyclone separator or baghouse filter.

After the desired amount of an enriched hydrogen gas stream has been generated from the molten metal, a suitable separate oxidizing agent is directed from oxidizing agent source 38 through line 36 and is injected through oxidizing agent tube 32 into molten metal 56. In one embodiment, the separate oxidizing agent is directed into molten metal 56 when the carbon, which is dissolved in the molten metal, approaches saturation in the molten metal. The separate oxidizing agent is directed into the molten metal separately from the organic waste. Examples of suitable oxidizing agents include oxygen, air, iron oxide, etc., with the preferred oxidizing agent being oxygen gas.

Introduction of a separate oxidizing agent into the carbonized molten metal results in the generation of an enriched carbon oxide gas stream as carbon in the metal is oxidized to decarbonize the metal. An enriched carbon oxide gas stream, as that term is used herein, means a gas stream wherein the molar fraction of carbon oxide gas contained in the gas stream based upon the total hydrogen and carbon oxide in the gas streams, is greater than that generally produced in a typical process disclosed by Bach/Nagel in U.S. Pat. Nos. 4,574,714 and 4,602,574 for the simultaneous, combined decomposition and oxidation of an organic waste. The molar fraction of carbon oxide gas is the ratio of the moles of carbon oxide gas contained in a gas stream to the sum of the moles of hydrogen and moles of carbon oxide gases contained in the gas stream.

The separate introduction of the oxidizing agent from the organic waste into the molten metal, as that term is used herein, means an injection of oxidizing agent separate chronologically from the organic waste in order to allow the formation of a distinct hydrogen gas stream and a distinct carbon oxide gas stream to be produced.

Molten metal 56 has a temperature sufficient to cause the organic waste injected into molten metal 56 to be converted to carbon, hydrogen and other atomic constituents and to cause hydrogen in molten metal 56 to form hydrogen gas and to carbonize the molten metal. Oxidizing agent, which oxidizes carbon contained in the molten metal, is directed into molten bath after the enriched hydrogen gas is removed and forms a carbon oxide gas, thereby forming an enriched carbon oxide gas stream.

The carbon oxide gas composition ratio of carbon monoxide to carbon dioxide can be adjusted by a number of techniques. One relates to the selection of the metal or metals. For example, iron tends to produce carbon monoxide whereas molten nickel or manganese tends to produce an increased amount of carbon dioxide.

U.S. Pat. No. 5,177,304, issued to Nagel (Jan. 5, 1993), discloses a method and system for increasing the formation of carbon dioxide from carbonaceous material in a molten bath of immiscible metals. The teachings of this patent are hereby incorporated by reference. As taught therein, an increased amount of carbon dioxide can be produced from a molten metal bath which has two immiscible molten metals wherein the first has a free energy of oxidation greater than that for oxidation for atomic carbon to carbon monoxide and the second has a free energy of oxidation greater than that for oxidation of carbon monoxide to form carbon dioxide.

The invention described herein is not limited to the above-described embodiments. For example, an alternative embodiment can include introducing the organic waste into the molten metal without the addition of a separate oxidizing agent and under conditions sufficient to decompose the organic waste, whereby the molten metal is carbonized and an enriched hydrogen gas stream is formed. The carbonized metal can then be solidified. At a later time, the carbonized metal can be melted, and a separate oxidizing agent can then be added into the carbonized metal to oxidize carbon contained in the carbonized molten metal to thereby form an enriched carbon oxide gas stream.

In yet another embodiment, molten metal can be carbonized to generate an enriched hydrogen gas stream in one portion of a reactor and decarbonized with addition of a separate oxidizing agent to generate an enriched carbon oxide gas stream in another portion of the same vessel. The vessel can have a wide variety of shapes and need not be configured as illustrated in the Figures herein.

Illustration I

An organic waste containing an organic compound having hydrogen and carbon, such as butane, is fed into a system, as shown in FIG. 1. The metal is iron at a temperature of about 1800° C. The organic waste is decomposed to its atomic constituents, including carbon and hydrogen in the molten metal. Hydrogen gas is generated and removed from reactor through the off-gas outlet as an enriched hydrogen gas stream. The molten metal is simultaneously carbonized.

Figure 2:
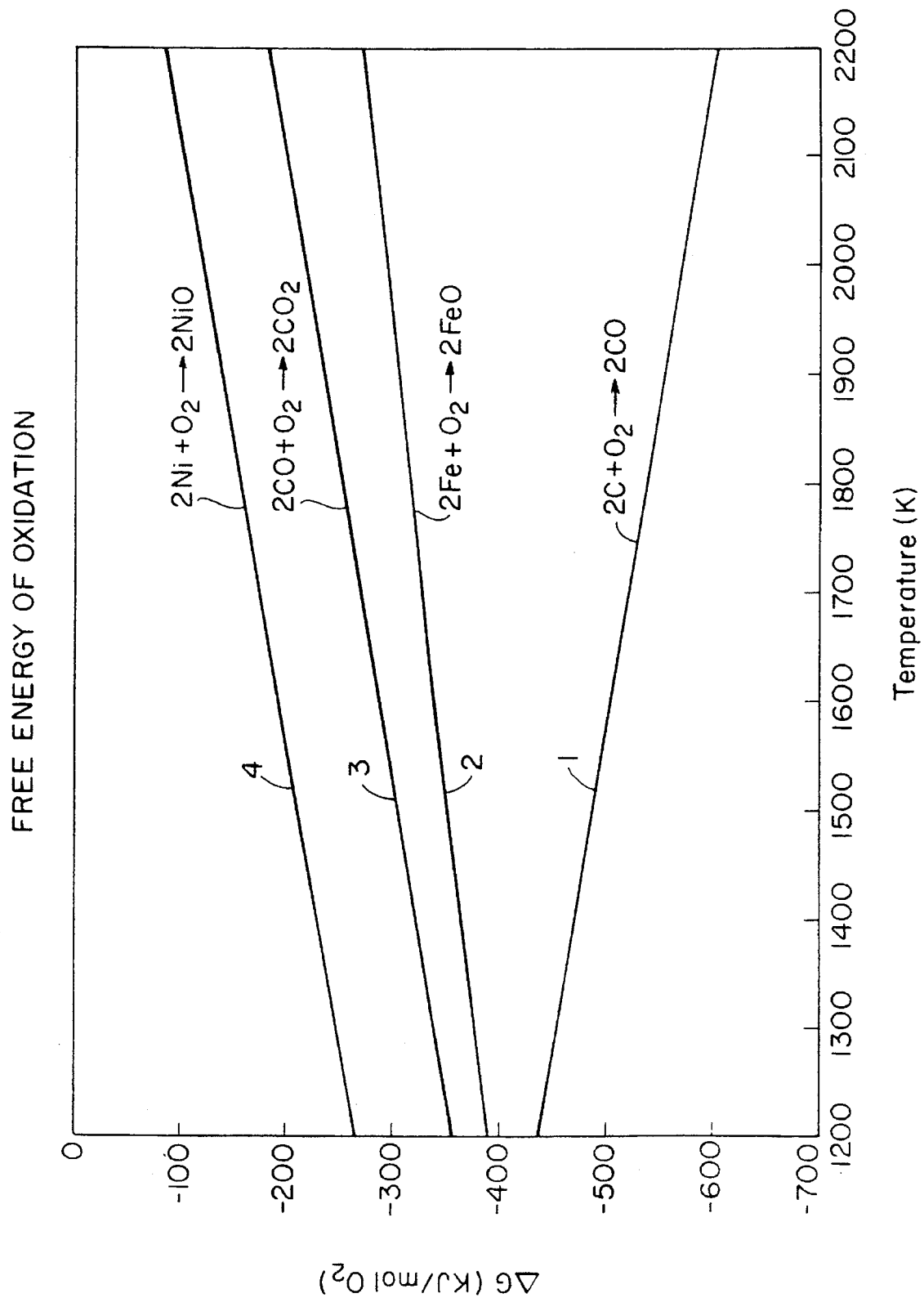
FIG. 2 is a plot of the free energies at varying temperatures for the oxidation of nickel, iron and carbon.

After the hydrogen gas is removed, an oxidizing agent, oxygen gas, is then added to the carbonized molten metal in the system. The reaction of carbon with the oxidizing agent occurs preferentially to the oxidation of the iron in the molten metal, because, as can be seen in FIG. 2, the free energy of oxidation of carbon (Curve 1) is lower than that of the iron (Curve 2) at the temperature of the molten metal. Carbon preferentially forms carbon monoxide to iron oxide or carbon dioxide because the free energy of oxidation to carbon dioxide (Curve 3) is greater than the free energy of oxidation of iron (Curve 2) which is greater than the free energy of oxidation for carbon to form carbon monoxide (Curve 1). Oxygen gas is added until carbon is removed from the molten metal. The carbon monoxide is separated from molten metal through the off-gas outlet which can then be directed to a carbon oxide collection tank, not shown, or vented to the atmosphere.

Illustration II

In a reactor configuration similar to Illustration I, organic waste containing an organic compound having hydrogen and carbon, such as butane, is fed into the molten metal of the reactor. However, the molten metal is nickel at a temperature of about 1800° C. The organic waste forms the atomic constituents of carbon and hydrogen in the molten metal causing separation of hydrogen from carbon by the decomposition of hydrogen to form hydrogen gas. The hydrogen gas is removed from reactor through the off-gas outlet in an enriched hydrogen gas stream. The molten metal is carbonized.

After the hydrogen gas is removed, oxidizing agent, oxygen gas, is then added to the Carbonized molten metal. The reaction of carbon with the oxidizing agent occurs preferentially to the oxidation of the nickel in the molten metal, because, as can be seen in FIG. 2, the free energy of oxidation of carbon (Curve 1) is lower than that of the nickel (Curve 4) at the temperature of molten metal. Carbon forms a mixture of carbon monoxide and carbon dioxide because the free energies of oxidation to form carbon dioxide (Curve 3) and to form carbon monoxide (Curve 1) are less than the free energy of oxidation of nickel. Oxygen gas is added until carbon is essentially consumed in the carbonized molten metal. The carbon oxide gases are separated from the molten metal through the off-gas outlet which can then be directed to a carbon oxide collection tank, not shown, or vented to the atmosphere.

We claim:

1. A method of treating an organic waste containing hydrogen and carbon in molten metal contained in a vessel to sequentially form enriched hydrogen and carbon oxide gas streams comprising the steps of:
    a) introducing the organic waste into molten metal, without the addition of a separate oxidizing agent and under conditions sufficient to decompose the organic waste and to form an enriched hydrogen gas stream and carbonize the molten metal;
    b) removing substantially all of the formed enriched hydrogen gas stream from the vessel;
    c) thereafter adding a separate oxidizing agent into the carbonized molten metal to oxidize carbon contained in the carbonized molten metal to form an enriched carbon oxide gas stream and to decarbonize the molten metal; and
    d) removing substantially all of the formed enriched carbon oxide gas stream from the vessel.

2. A method of claim 1 wherein the enriched carbon oxide gas stream comprises carbon monoxide.

3. A method of claim 2 wherein the molten metal comprises iron.

4. A method of claim 3 wherein the separate oxidizing agent comprises oxygen gas.

5. A method of claim 1 wherein the enriched carbon oxide gas comprises a mixture of carbon monoxide and carbon dioxide gases.

6. A method of claim 5 wherein the molten metal is selected to provide a significantly increased molar ratio of carbon dioxide/carbon monoxide compared to that produced in molten iron.

7. A method of claim 5 wherein the molten metal comprises manganese.

8. A method of claim 5 wherein the molten metal comprises two immiscible metals having a first immiscible metal having a free energy of oxidation, at the conditions of the molten metal, greater than that of oxidation of atomic carbon to form carbon monoxide and a second immiscible metal having a free energy of oxidation, at the conditions of the molten metal, greater than that of oxidation of carbon monoxide to form carbon dioxide.

9. A method of claim 8 wherein said molten metal comprises an immiscible mixture of iron and copper.

10. A method of treating an organic waste containing hydrogen and carbon in molten metal contained in a vessel to sequentially form enriched hydrogen and carbon oxide gas streams, said carbon oxide gas having a significantly increased molar ratio of carbon dioxide/carbon oxide compared to that produced in molten iron under the same conditions, comprising the steps of:
    a) introducing the organic waste into molten metal which comprises two immiscible metals wherein, at the operating conditions, the first immiscible metal has a free energy of oxidation greater than that for oxidation of carbon to carbon monoxide and the second immiscible metal having a free energy of oxidation greater than that for oxidation of carbon monoxide to carbon dioxide, without the addition of a separate oxidizing agent and under conditions sufficient to decompose the organic waste and to generate an enriched hydrogen gas stream and carbonize the molten metal;
    b) removing substantially all of the formed enriched hydrogen gas stream from the vessel;
    c) thereafter adding a separate oxidizing agent into the carbonized molten metal to oxidize carbon contained in the carbonized molten metal to generate an enriched carbon oxide gas stream having a significantly increased ratio of carbon dioxide/carbon monoxide compared to that produced in molten iron under the same conditions; and
    d) removing substantially all of the formed enriched carbon oxide gas stream from the vessel.

11. A method of treating an organic waste containing hydrogen and carbon to sequentially form enriched hydrogen and carbon monoxide gas streams, comprising the steps of:
    a) introducing the organic waste into molten iron contained within a vessel, without the addition of a separate oxidizing agent and under conditions sufficient to decompose the organic waste and to generate an enriched hydrogen gas stream and to carbonize the molten metal;
    b) removing substantially all of the formed enriched hydrogen gas stream from the vessel;
    c) thereafter adding a separate stream of oxygen gas into the carbonized molten iron to oxidize the carbon contained in the carbonized molten iron to thereby form an enriched carbon monoxide gas stream and to decarbonize the molten metal iron; and
    d) removing substantially all of the formed enriched carbon monoxide gas stream from the vessel.

12. In a method for treating an organic waste containing hydrogen and carbon by introducing the organic waste into molten metal contained in a vessel under conditions sufficient to decompose the organic waste and including the addition of an oxidizing agent to the molten metal to form hydrogen and carbon oxide gases:
    the improvement of generating enriched hydrogen and carbon oxide gas streams by introducing the organic waste into molten metal without the addition of said oxidizing agent thereby carbonizing the molten metal and forming a separate enriched hydrogen gas stream and after substantially removing the enriched hydrogen gas stream, separately introducing said oxidizing agent into the carbonized molten metal to decarbonize said molten metal, thereby generating a separate enriched carbon oxide gas stream.

13. The improvement of claim 12 wherein the molten metal is carbonized and decarbonized in the same reactor vessel to generate enriched hydrogen and carbon oxide gas streams.

* * * * *